US008589066B2

(12) United States Patent
Haleem

(10) Patent No.: US 8,589,066 B2
(45) Date of Patent: Nov. 19, 2013

(54) NAVIGATION SYSTEM WITH PREDICTED POSITIONING CONDITION MECHANISM AND METHOD OF OPERATION THEREOF

(75) Inventor: Ambreen Haleem, Sunnyvale, CA (US)

(73) Assignee: Telenav, Inc., Sunnyvale, CA (US)

( * ) Notice: Subject to any disclaimer, the term of this patent is extended or adjusted under 35 U.S.C. 154(b) by 404 days.

(21) Appl. No.: 12/889,565

(22) Filed: Sep. 24, 2010

(65) Prior Publication Data

US 2012/0078501 A1    Mar. 29, 2012

(51) Int. Cl.
 *G01C 21/32* (2006.01)
(52) U.S. Cl.
 USPC .......................................... 701/408; 701/500
(58) Field of Classification Search
 USPC ................ 701/408, 500, 533, 491, 483, 516; 455/418, 456.1, 456.3, 456.5, 456, 6, 455/457, 404.2, 572–574, 452.5, 432.1, 455/436, 441, 456.2, 422.1, 428, 432.2, 455/439, 421; 370/252, 329, 332–336, 370/341–345, 465, 431; 342/357.64, 342/357.66, 357.29, 357.46, 353, 357.74, 342/105, 113, 114, 106; 340/988, 990
 See application file for complete search history.

(56) References Cited

U.S. PATENT DOCUMENTS

| | | | |
|---|---|---|---|
| 5,613,213 A * | 3/1997 | Naddell et al. | 455/435.2 |
| 6,721,572 B1 * | 4/2004 | Smith et al. | 455/456.1 |
| 6,915,208 B2 | 7/2005 | Garin et al. | |
| 7,079,945 B1 | 7/2006 | Kaplan | |
| 7,359,713 B1 | 4/2008 | Tiwari | |
| 7,440,762 B2 | 10/2008 | Maloney et al. | |
| 7,577,448 B2 | 8/2009 | Pande et al. | |
| 2004/0116138 A1 * | 6/2004 | Greenspan et al. | 455/501 |
| 2004/0242240 A1 | 12/2004 | Lin | |
| 2006/0183487 A1 | 8/2006 | Allen et al. | |
| 2008/0133126 A1 * | 6/2008 | Dupray | 701/204 |
| 2008/0162032 A1 | 7/2008 | Wuersch et al. | |
| 2009/0203388 A1 | 8/2009 | Karaoguz | |
| 2009/0245118 A1 | 10/2009 | McCormick | |
| 2009/0247137 A1 | 10/2009 | Awad | |
| 2010/0056181 A1 * | 3/2010 | Rippon et al. | 455/456.3 |
| 2010/0198496 A1 | 8/2010 | Victor et al. | |
| 2010/0302014 A1 * | 12/2010 | Gloo et al. | 340/326 |
| 2011/0159884 A1 * | 6/2011 | Chawla | 455/456.1 |

OTHER PUBLICATIONS

International Search Report for PCT Application No. PCT/US2011/041696 dated Nov. 3, 2011.

* cited by examiner

*Primary Examiner* — Thomas Black
*Assistant Examiner* — Marthe Marc-Coleman
(74) *Attorney, Agent, or Firm* — IP Investment Law Group

(57) ABSTRACT

A method of operation of a navigation system includes: obtaining a first coverage location; determining a first coverage quality at the first coverage location is below a predefined threshold; generating an adaptive coverage area around the first coverage location for displaying on a device; selecting a preferred mode for positioning fix associated with the adaptive coverage area; and operating the preferred mode inside the adaptive coverage area.

20 Claims, 9 Drawing Sheets

NAVIGATION SYSTEM WITH PREDICTED POSITIONING CONDITION MECHANISM AND METHOD OF OPERATION THEREOF

TECHNICAL FIELD

The present invention relates generally to a navigation system, and more particularly to a system with location-based services.

BACKGROUND ART

Modern portable consumer and industrial electronics provide increasing levels of functionality to support modern life including telecommunications and location-based information services. This is especially true for client devices such as navigation systems, cellular phones, portable digital assistants, and multifunction devices.

As users adopt mobile location based service devices, new and old usage begin to take advantage of this new device space. There are many solutions to take advantage of this new device opportunity. One existing approach is to use location information to provide navigation services, such as a global positioning service (GPS) navigation system for a mobile device.

Navigation system and service providers are continually making improvement in the user's experience in order to be competitive. Systems can display map information, navigate and display a route between two points, and enable other services on these devices. Positioning systems have the ability to locate a device with a degree of accuracy, such as within a few hundred meters. Also, systems can operate different positioning functions to identify their location.

However, increasing demand from consumers is forcing the pace of development in this area. As this demand increases and commercial pressures grow, systems are required to provide more and more functionality with timely and accurate responsiveness and improved reliability.

Thus, a need still remains for a navigation system to provide information with improvement in usability, performance, and accuracy. In view of the importance of positioning systems in modern life, it is increasingly critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: obtaining a first coverage location; determining a first coverage quality at the first coverage location is below a predefined threshold; generating an adaptive coverage area around the first coverage location for displaying on a device; selecting a preferred mode for positioning fix associated with the adaptive coverage area; and operating the preferred mode inside the adaptive coverage area.

The present invention provides a navigation system, including: a coverage location module for obtaining a first coverage location; a signal measurement module, coupled to the coverage location module, for determining a first coverage quality at the first coverage location is below a predefined threshold; a delineate module, coupled to the signal measurement module, for generating an adaptive coverage area around the first coverage location for displaying on a device; a selection module, coupled to the delineate module, for selecting a preferred mode for positioning fix associated with the adaptive coverage area; and a mode operation module, coupled to the selection module, for operating the preferred mode inside the adaptive coverage area.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
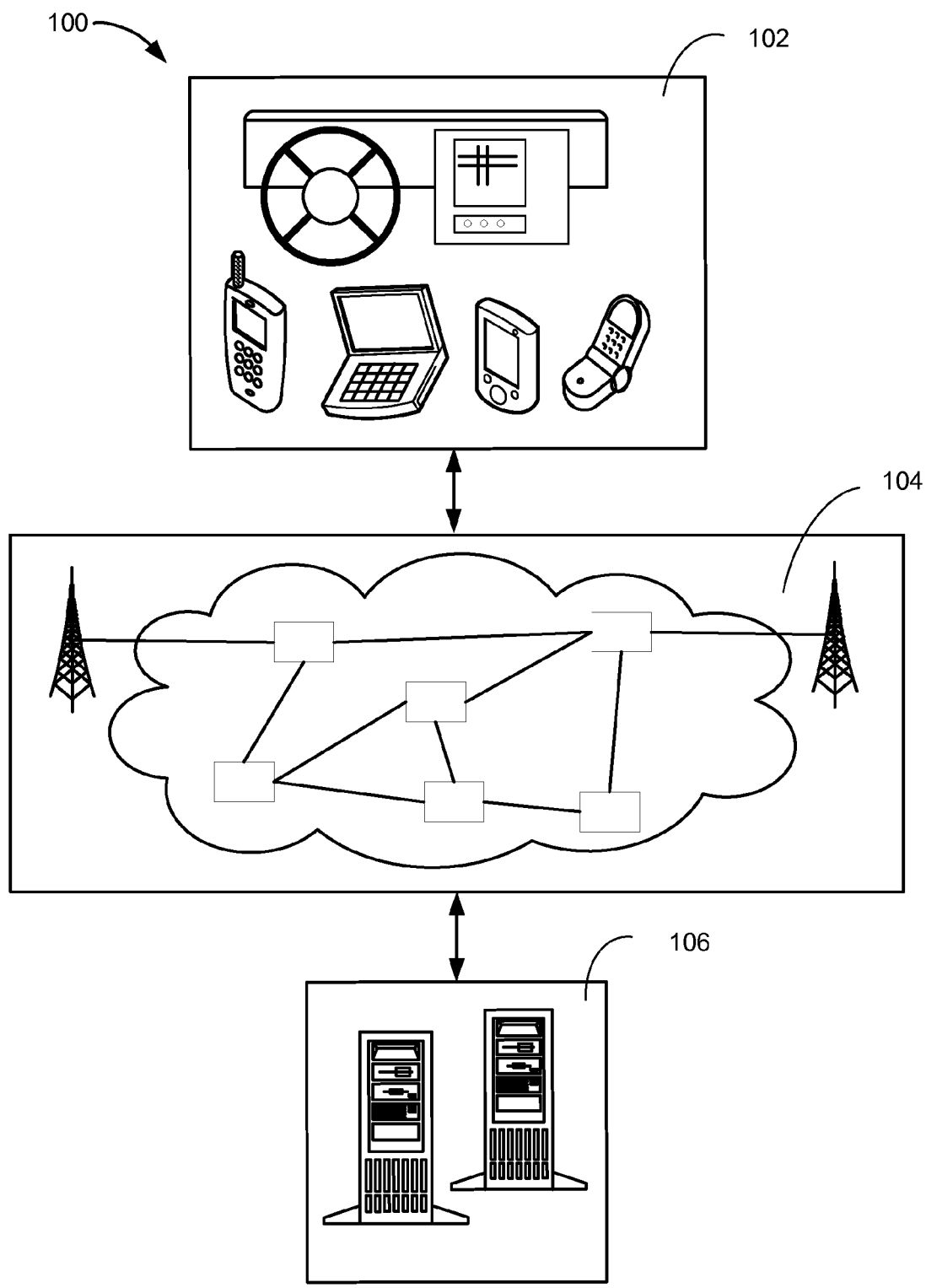
FIG. 1 is a navigation system with predicted positioning conditions in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X,Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "positioning system" referred to herein can include means for deriving location information for a device. For example, a positioning system can include software, hardware or a combination thereof for deriving location information for a device. Further, such a system can include GPS, GPS with modified settings or sampling rate, inertial navigation system, cellular-tower location system, accelerometer location system, or any combination thereof.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with predicted positioning conditions in a first embodiment of the present invention. The navigation system 100 includes a first device 102, such as a client or a server, connected to a second device 106, such as a client or a server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or a combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
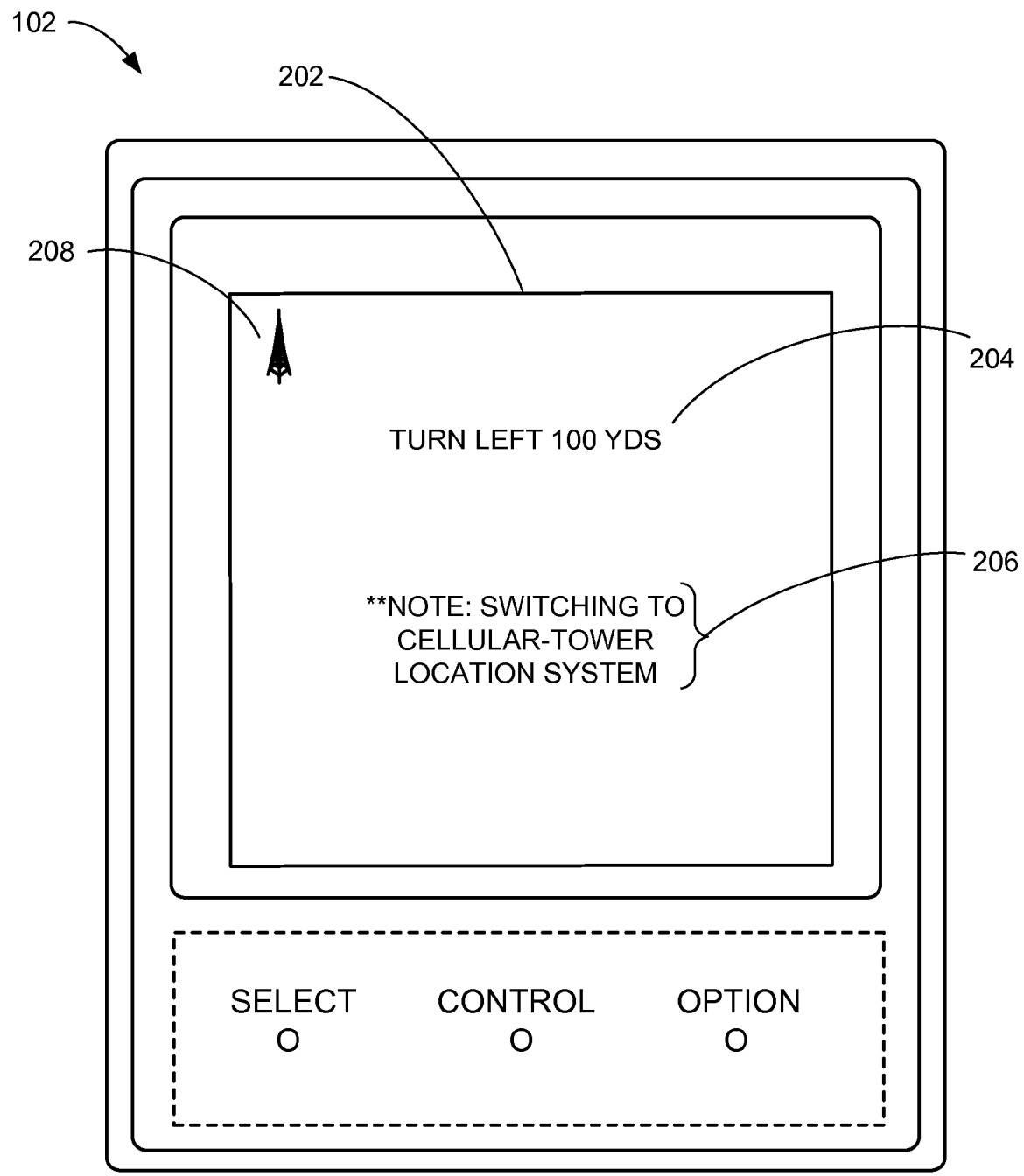
FIG. 2 is a display interface of the first device.

Referring now to FIG. 2, therein is shown a display interface 202 of the first device 102. The illustration shows the first device 102 with the display interface 202 with two example messages.

The illustration shows a route guidance 204. The route guidance 204 is defined as instructions for traversing a route (not shown). The route guidance 204 can be generated by the navigation system 100 and can be presented in audio, visual, or a combination thereof. The navigation system 100 can select a navigable route for display on a device, such as the first device 102. As the first device 102 proceeds along the navigable route, the navigation system 100 can display the route guidance 204 associated with the location of the first device 102 on the navigable route. The route guidance 204 can be displayed on the display interface 202.

The illustration also shows a mode advisory 206 on the display interface 202 indicating a switch to a different positioning system. The mode advisory 206 is defined as a message that indicates the mode of operation of the first device 102. In this example, the mode advisory 206 includes a message advising of a switch to a cellular-tower location system.

The illustration also shows an icon 208 on the display interface 202. The icon 208 offers a visual indication of the mode advisory 206. In this example, the icon 208 includes an image of a cellular tower, as a visual indication that the navigation system 100 can switch to a cellular-tower location system. The indication can include other forms, such as audible tones, spoken advisories, a flashing icon, or a flashing text message.

The navigation system 100 can utilize one or more positioning systems for determining a location reading. The quality or availability of coverage of a positioning system in any area can be compromised. For example, the positioning function of a GPS system can be compromised in a metropolitan setting. GPS signals can be blocked by buildings, or can reflect off buildings causing a multipath effect. GPS signals can also be impeded inside tunnels, near geological formations or other physical entities in the proximity of a mobile device.

While such impairment can be permanent in some areas, GPS positioning systems can also be subject to temporary impairment, for example an impairment caused by satellite geometry. Satellite geometry, which refers to the alignment of GPS satellites relative to the mobile device, can give rise to an imprecise location reading, or may inhibit the reading completely. As GPS satellites orbit the earth, the quality of GPS coverage at a location can fall and rise according to the position of the satellite relative to the location on the earth.

Other examples of positioning systems include cellular-tower location systems, accelerometer location systems, inertial navigation systems, or a combination thereof. Cellular-tower location systems make use of proximity to a cellular-tower network to determine the location of a device. Cellular-tower location systems are less likely to be impaired by buildings and they are widely available in populated areas, especially urban centers. However, cellular-tower networks are less prevalent in less populated areas, and therefore do not provide an alternative in all locations.

Figure 3:
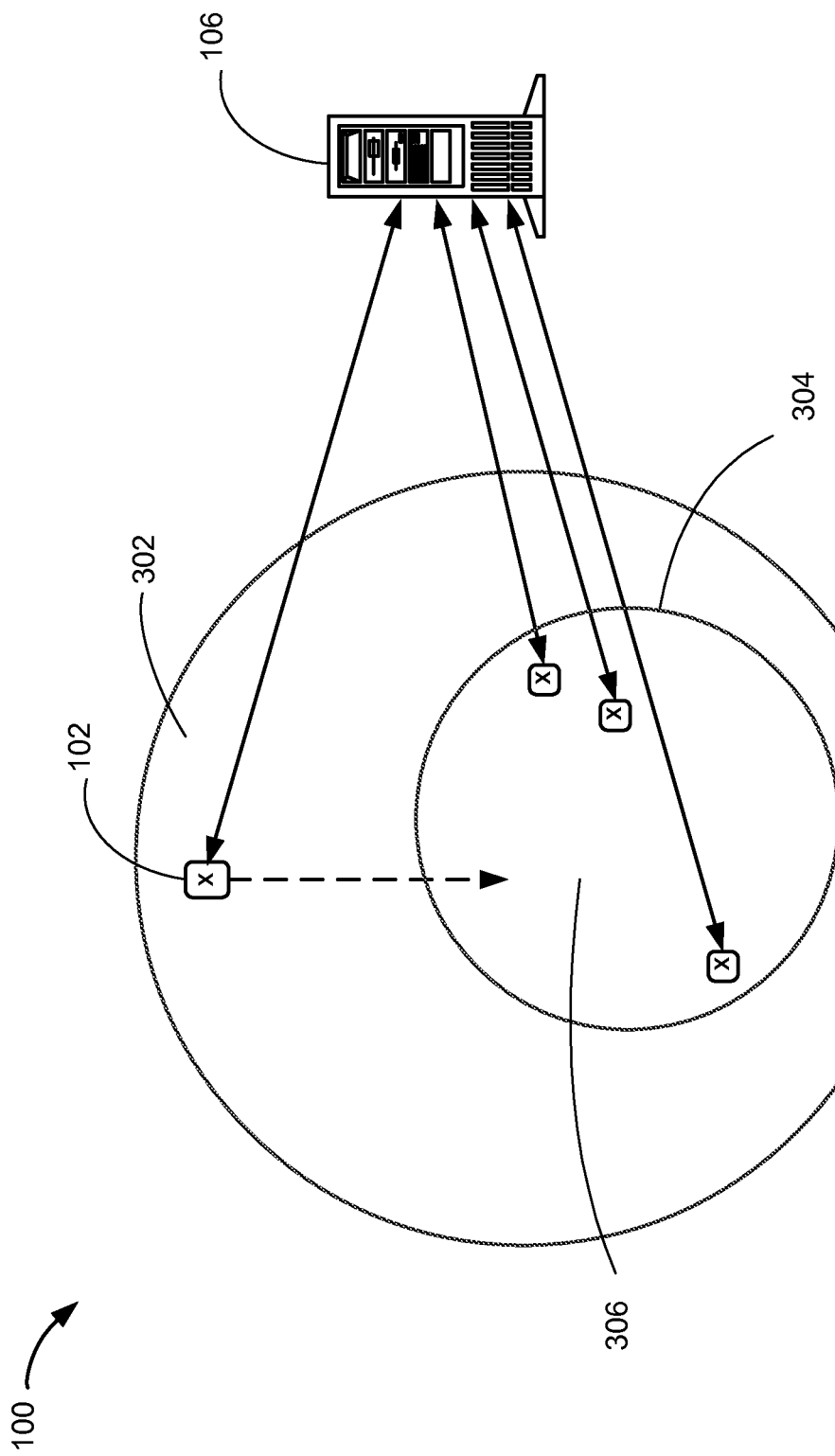
FIG. 3 is a geographic view of a first application example of the navigation system.

Referring now to FIG. 3, therein is shown a geographic view of a first application example of the navigation system 100. The illustration shows an application of the navigation system 100 with predicted positioning conditions operating.

The illustration shows a geographic region 302. The geographic region 302 is defined as a geographic area predefined by area of interest for the navigation system 100 and is predefined by GPS signal strength and accuracy or by predetermined geographic entities as a city, down town, or a neighborhood, For illustrative purposes, the geographic region 302 is shown bounded by a solid circle, although it is understood that the geographic region can be another geometric shape. The geographic region 302 can be represented by map data, which can include a database from which relevant information can be extracted for navigation or guidance purposes. For example, the map data can include feature information or a road network, from which a navigable route between two locations can be selected. For illustrative purposes, the features of the geographic region 302 are not shown in this illustration.

The illustration shows the first device 102 in the geographic region 302. The first device 102 is shown moving in a direction indicated by a dashed arrow. Also, other devices, which can be described as the first device 102, are shown in the geographic region 302. The first device 102 and the other devices are also shown communicating with the second device 106 across the communication path 104 of FIG. 1. This communication is represented in the illustration by solid arrows. It is understood that the first device 102 and the other devices can also communicate with each other, although for illustrative purposes, this communication is not shown.

The illustration also shows a coverage boundary 304, which encloses an adaptive coverage area 306. The adaptive coverage area 306 is defined as an area of the geographic region 302, in which the quality or availability of a positioning system is compromised. The positioning system is compromised when the navigation system 100 cannot provide or determine the location fix for the first device 102 in the frequency the navigation system 100 would like to get the location fix or if the location fixes are frequently erroneous.

For example, in an urban setting, the quality or availability of a GPS system can be compromised by the presence of tall buildings, a phenomenon sometimes referred to as an "urban canyon". Such an area can be represented by the adaptive coverage area 306, and can be bounded by the coverage boundary 304.

The adaptive coverage area 306 is adaptive because the area of compromised positioning coverage can expand or contract with the quality or availability of a positioning system. For example, in GPS positioning, satellite geometry can affect the quality of a location sampling. As the satellites in the GPS constellation orbit the earth, their positions change relative to the earth's surface, and GPS coverage in any area can improve or degrade. The adaptive coverage area 306 can expand or contract to reflect this changing area.

The coverage boundary 304 can be an outline enclosing the adaptive coverage area 306. The coverage boundary 304 can distinguish an area with adequate positioning coverage from the adaptive coverage area 306 with compromised or low-quality coverage. As the adaptive coverage area 306 changes, the coverage boundary 304 can change to contain the adaptive coverage area 306. The purpose of the coverage boundary 304 around the adaptive coverage area 306 is to identify an area of the geographic region 302 in which the integrity of a positioning system is compromised.

In the illustration, the first device 102 is shown approaching the coverage boundary 304. The navigation system 100 can recognize that the first device 102 is approaching the adaptive coverage area 306, and can schedule a transition to another positioning system, or different settings for the same positioning system. The navigation system 100 can schedule the transition to coincide with the first device 102 traversing the coverage boundary 304 into the adaptive coverage area 306, as will be described in more detail.

Devices with the navigation system 100 can obtain information about their location and the quality or availability of a positioning system at that location. This information can be used by the navigation system 100 to identify the adaptive coverage area 306 and to delineate the coverage boundary 304 around the adaptive coverage area 306.

Figure 4:
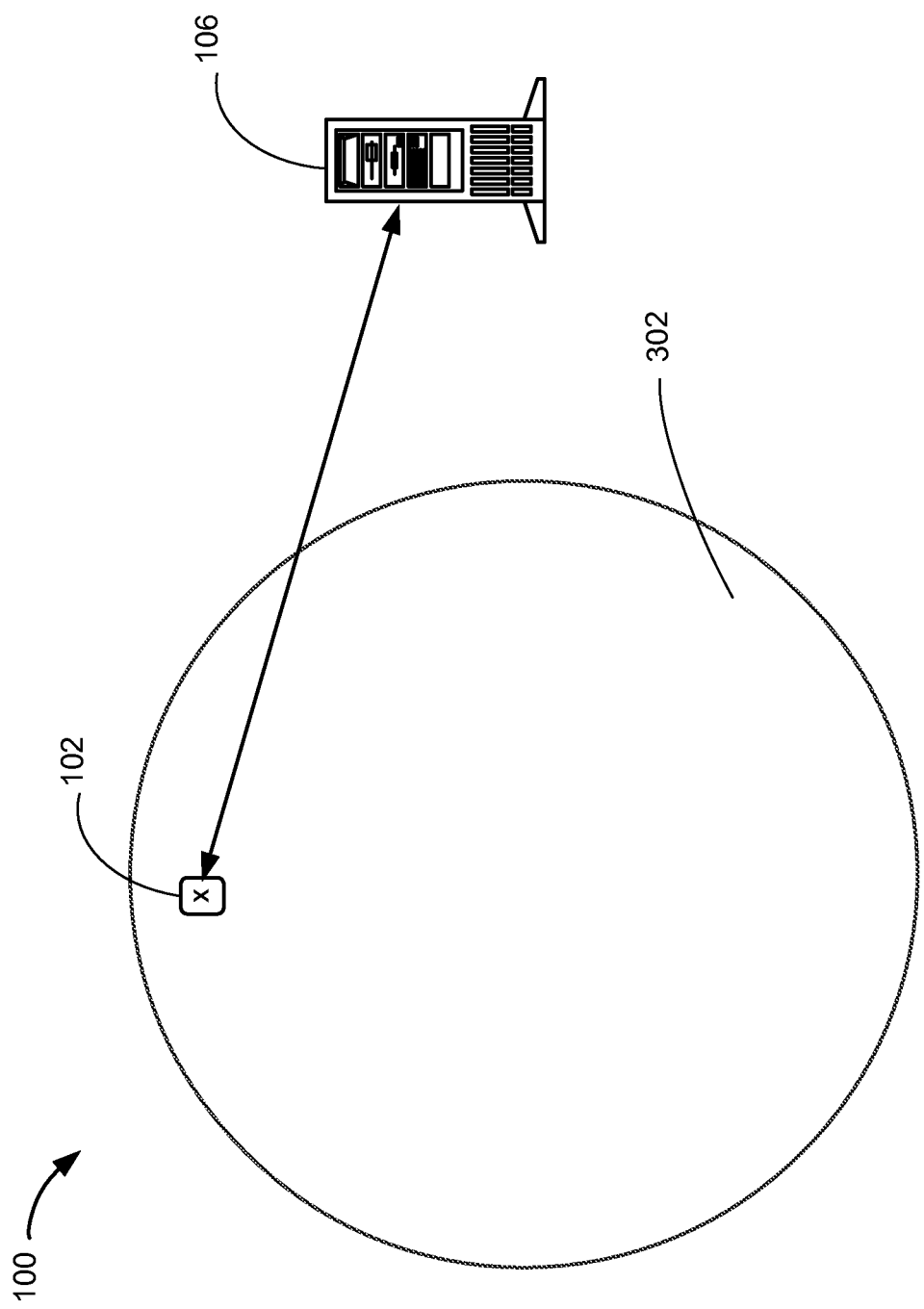
FIG. 4 is a geographic view of a second application example of the navigation system with predicted positioning conditions.

Referring now to FIG. 4, therein is shown a geographic view of a second application example of the navigation system with predicted positioning conditions. The first device 102 is depicted in the geographic region 302 and in communication with the second device 106. The communication between the devices is illustrated by the solid arrow.

In this example, the first device 102 can be slow-moving or stationary. The term slow-moving is defined as a vehicle or person utilizing the navigation system 100 traveling significantly below the speed limit of the thoroughfare on which it is moving. The navigation system 100 can determine when the first device 102 is slow-moving or stationary, and can switch the navigation system 100 to another mode to reduce the power consumption of the first device 102. For example, the navigation system 100 can switch the positioning system to a reduced sampling rate, if the first device 102 is slow-moving or stationary for an extended period of time.

The navigation system 100 can predict whether a device with the navigation system 100 is going to stop or start moving. For example, if the first device 102 is at the start of a selected route, the navigation system 100 can determine that the first device 102 is about to start moving. As a further example, as the first device 102 approaches the end of a navigable route, it can be deemed to be on the point of stopping or slowing down. In response to stopping, starting, or changing speed, the navigation system 100 can modify the sampling rate or reading interval of a positioning system appropriately to reduce power consumption, wear and tear, or a combination thereof on the device.

As an example, if the first device 102 is using GPS as a positioning system, the interval for GPS location samples can increase or decrease according to the first device 102 speeding up, slowing down, or stopping., without loss of integrity of the location sample of the first device 102.

Figure 5:
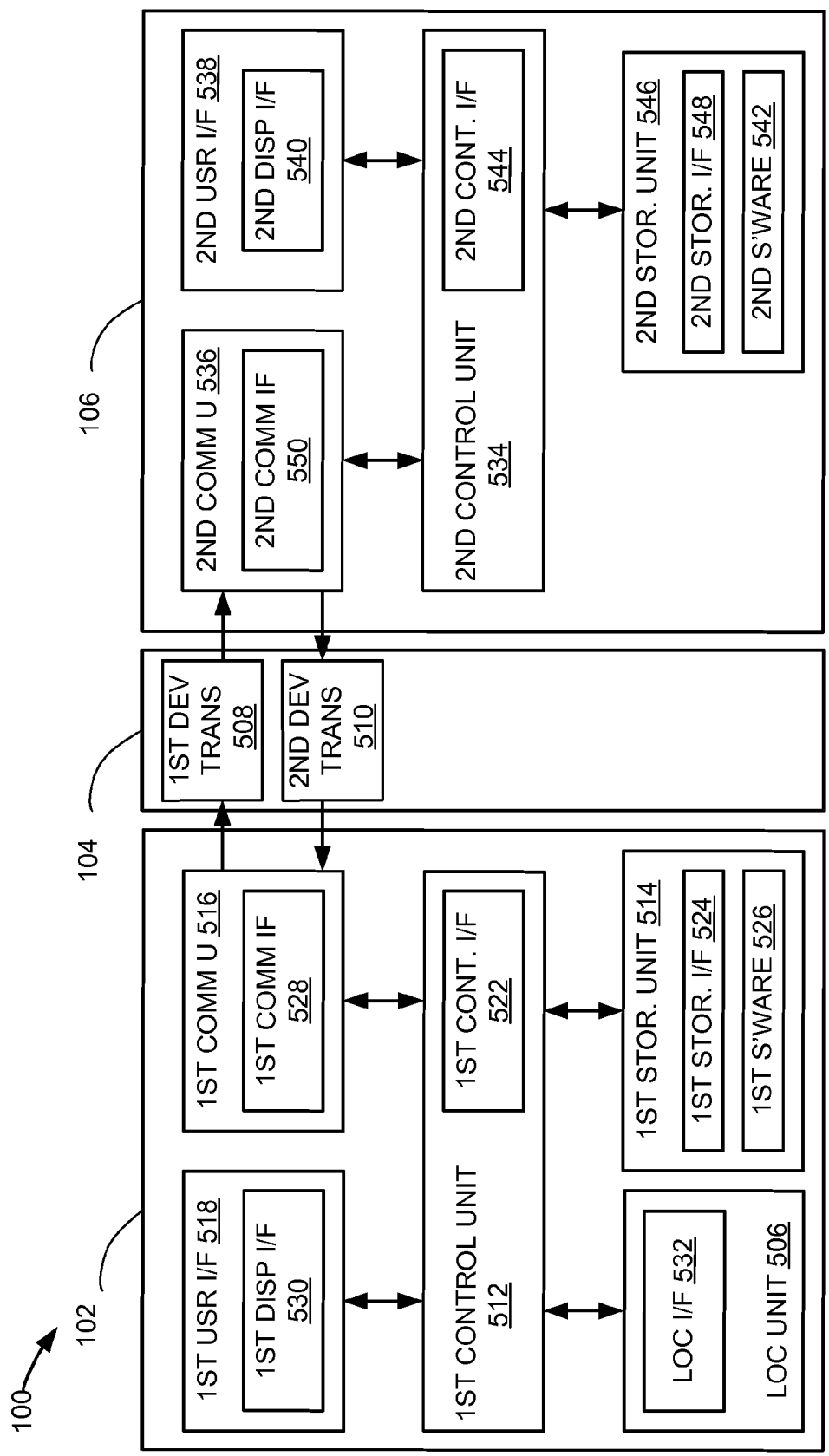
FIG. 5 is an exemplary block diagram of the navigation system.

Referring now to FIG. 5, therein is shown an exemplary block diagram of the navigation system 100. The navigation system 100 can include the first device 102, the communication path 104, and the second device 106. The first device 102 can send information in a first device transmission 508 over the communication path 104 to the second device 106. The second device 106 can send information in a second device transmission 510 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 512, a first storage unit 514, a first communication unit 516, a first user interface 518, and a location unit 506. The first control unit 512 can include a first control interface 522. The first control unit 512 can execute a first software 526 to provide the intelligence of the navigation system 100. The first control unit 512 can be implemented in a number of different manners. For example, the first control unit 512 can be a processor, an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations external to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The location unit 506 can generate location information, current heading, and current speed of the first device 102, as examples. The location unit 506 can be implemented in many ways. For example, the location unit 506 can function as at least a part of a global positioning system (GPS), an inertial navigation system, a cellular-tower location system, a pressure location system, or any combination thereof.

The location unit 506 can include a location interface 532. The location interface 532 can be used for communication between the location unit 506 and other functional units in the first device 102. The location interface 532 can also be used for communication that is external to the first device 102.

The location interface 532 can receive information from the other functional units or from external sources, or can transmit information to the other functional units or to external destinations. The external sources and the external destinations refer to sources and destinations external to the first device 102.

The location interface 532 can include different implementations depending on which functional units or external units are being interfaced with the location unit 506. The location interface 532 can be implemented with technologies and techniques similar to the implementation of the first control interface 522.

The first storage unit 514 can store the first software 526. The first storage unit 514 can also store the relevant information, such as advertisements, points of interest (POI), navigation routing entries, or any combination thereof.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between the location unit 506 and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations external to the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, or any combination thereof to provide data and communication inputs.

The first user interface 518 can include a first display interface 530. The first display interface 530 can include a display, a projector, a video screen, a speaker, or any combination thereof.

The first control unit 512 can operate the first user interface 518 to display information generated by the navigation system 100. The first control unit 512 can also execute the first software 526 for the other functions of the navigation system 100, including receiving location information from the location unit 506. The first control unit 512 can further execute the first software 526 for interaction with the communication path 104 via the first communication unit 516.

The second device 106 can be optimized for implementing the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the navigation system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the navigation system 100, including operating the second communication unit 536 to communicate with the first device 102 over the communication path 104.

The second control unit 534 can be implemented in a number of different manners. For example, the second control unit 534 can be a processor, an embedded processor, a microprocessor, a hardware control logic, a hardware finite state machine (FSM), a digital signal processor (DSP), or a combination thereof.

The second control unit 534 can include a second controller interface 544. The second controller interface 544 can be used for communication between the second control unit 534 and other functional units in the second device 106. The second controller interface 544 can also be used for communication that is external to the second device 106.

The second controller interface 544 can receive information from the other functional units or from external sources, or can transmit information to the other functional units or to external destinations. The external sources and the external destinations refer to sources and destinations external to the second device 106.

The second controller interface 544 can be implemented in different ways and can include different implementations depending on which functional units or external units are being interfaced with the second controller interface 544. For example, the second controller interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 100 is shown with the second storage unit 546 as a single hierarchy storage system, although it is understood that the navigation system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between the location unit 506 and other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations external to the second device 106.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The navigation system 100 can be executed by the first control unit 512, the second control unit 534, or a combination thereof.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 506, although it is understood that the second device 106 can also operate the location unit 506.

Figure 6:
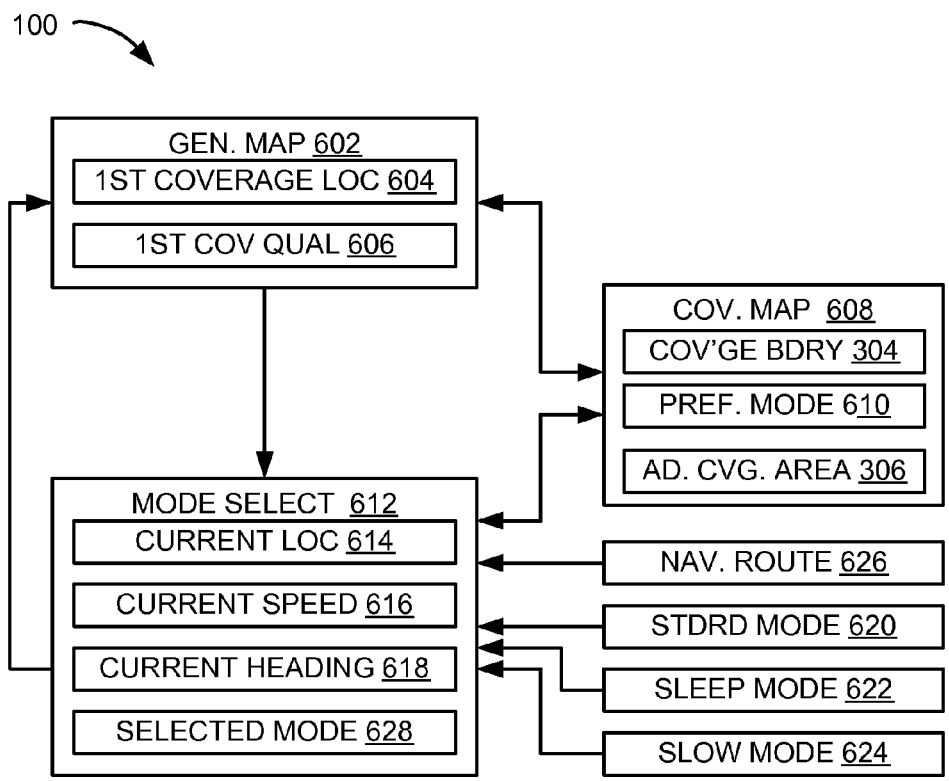
FIG. 6 is a flow chart of the navigation system.

Referring now to FIG. 6, therein is shown a flow chart of the navigation system 100. The control flow can pass from one module to another as indicated in the illustration. As an example, the navigation system 100 can be operated on the first device 102 of FIG. 5 or the second device 106 of FIG. 5, or partitioned between the two devices. For brevity of description, the navigation system 100 will be described operating on the first device 102.

The navigation system 100 can include a generate map module 602. The generate map module 602 determines the coverage map of the positioning system. The generate map module 602 can obtain a first coverage location 604 and can determine a first coverage quality 606 associated with the first coverage location 604. The first coverage location 604 is defined as a geographic position of the first device 102 to be used for determining positioning system coverage, and can be represented as a street address, an intersection of thoroughfares, latitude and longitude coordinates, or a combination thereof, to identify the position of the first device 102.

The first coverage quality 606 is defined as the effectiveness of a positioning system operating on a device, such as the first device 102, at the first coverage location 604. For example, the first coverage quality 606 can be measured as the signal strength or signal quality of a received signal. As in the example of the satellite geometry, the signal strength or signal quality can vary from location to location or at different times.

The generate map module 602 can generate a coverage map 608 with the coverage boundary 304, the adaptive coverage area 306, and a preferred mode 610. The coverage map 608 is defined as a map region that includes information relating to points of interest to the user. The points of interest can include local businesses, hours of business, types of business, advertised specials, traffic information, maps, local events, and nearby community or personal information.

The generate map module 602 can generate or modify the coverage map 608 with a new or revised version of the coverage boundary 304, the adaptive coverage area 306, and the preferred mode 610. As other devices, as discussed in FIG. 3, provide updated information for the position location fixes, the generate map module 602 can modify the coverage map 608 by increasing the coverage boundary 304 and the adaptive coverage area 306 if the problematic areas grows, leave it the same if there is no change, or otherwise decrease the coverage boundary 304 and the adaptive coverage area 306 if the problematic areas shrinks.

The preferred mode 610 is defined as a positioning system, or a mode of operating a positioning system, which can efficiently and accurately give results for positioning in the adaptive coverage area 306. For example, if the navigation system 100 determines that GPS is ineffective or compromised at a location, a module of the generate map module 602 can select a cellular-tower location system as the preferred mode 610 for operating in the adaptive coverage area 306. Other examples of the preferred mode 610 can include an inertial navigation system, an accelerometer location system, or GPS with modified settings or sampling rate.

The navigation system 100 can also include a mode select module 612. The purpose of the mode select module 612 is to predict when a device with the navigation system 100 will move into or out of an area with impaired or limited positioning as the adaptive coverage area 306, and to schedule a switch to a mode of operation appropriate for the conditions in that area.

The mode select module 612 can obtain a current location 614, a current speed 616, and a current heading 618 of the first device 102. The current location 614 is defined as the geographic location of the first device 102. The current location 614 can be used as the first coverage location 604 when the first coverage quality 606 needs to be assessed from the current location 614. The current speed 616 is defined as the travel rate of the first device 102. The current heading 618 is defined as the travel direction of the first device 102 at the time a reading for the current location 614 is taken.

The mode select module 612 can also receive the coverage map 608. The mode select module 612 can calculate a traversal of the coverage boundary 304 by a device with the navigation system 100, and can operate the preferred mode 610 on the device.

The mode select module 612 can also receive a standard mode 620. The standard mode 620 is defined as a positioning system, or a method of operating a positioning system, which is the default system for the navigation system 100. As an example, the standard mode 620 can be a global positioning system (GPS). The navigation system 100 can operate the standard mode 620 in areas of the coverage map 608 which are not enclosed by the coverage boundary 304 where the positioning system can operate effectively. For example, in areas outside the adaptive coverage area 306, the navigation system 100 can operate the standard mode 620.

The mode select module 612 can also receive a sleep mode 622. The sleep mode 622 is defined as a low-power method of operation of a positioning system for the purpose of lowering power consumption in the navigation system 100. As an example, the sleep mode 622 can suspend location sampling in a GPS to reduce energy consumption. The navigation system 100 can operate the sleep mode 622 if a device with the navigation system 100 is stationary for a predetermined amount of time.

The mode select module 612 can also receive a slow mode 624. The slow mode 624 can be a reduced-power method of operation of a positioning system. As an example, the slow mode 624 can operate location sampling in a GPS at a reduced rate to limit power consumption in a slow-moving device. An example of a slow-moving device can include a car with the navigation system 100 in heavy traffic at a slow rate of speed.

Another example of an application of the slow mode 624 can include the use of a navigable route 626. The navigable route 626 is defined as a travel route being traversed or to be traversed by a user of the first device 102. The mode select module 612 can receive the navigable route 626 from another module or device. The navigation system 100 can track the progress of a device, such as the first device 102, along the navigable route 626. As the first device 102 approaches the end of the navigable route 626, the navigation system 100 can operate the slow mode 624 in anticipation of the first device 102 stopping at the destination location.

The mode select module 612 can choose a selected mode 628 for operating on the first device 102. The selected mode 628 is defined as the mode of operation of the first device 102 in the adaptive coverage area 306. For example, the mode select module 612 can choose the preferred mode 610 associated with the adaptive coverage area 306. The mode select module 612 can also operate the preferred mode 610 as the selected mode 628 on the first device 102, if the first device 102 traverses the coverage boundary 304 into the adaptive coverage area 306. In another example, the mode select module 612 can select the standard mode 620 as the selected mode 628, for operating outside the adaptive coverage area 306. As yet further example, the mode select module 612 can select the sleep mode 622 or the slow mode 624 as the selected mode 628 for operating on the first device 102 as required.

Figure 7:
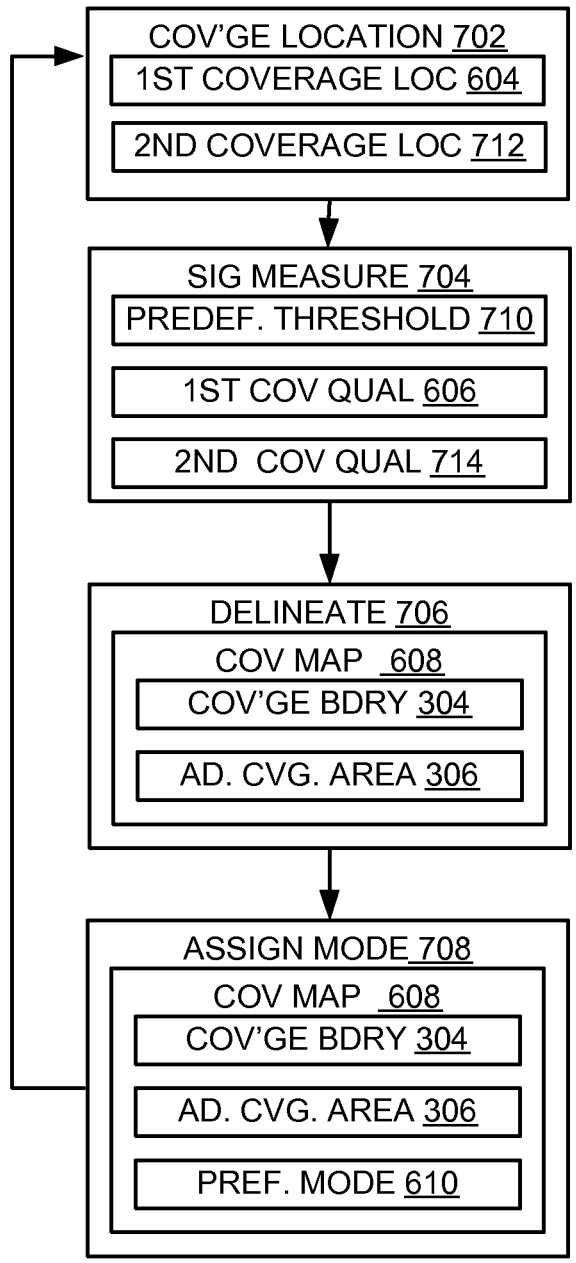
FIG. 7 is a flow chart of the generate map module.

Referring now to FIG. 7, therein is shown a flow chart of the generate map module 602. The generate map module 602 can include the modules and functions for generating the coverage map 608 with the coverage boundary 304, the adaptive coverage area 306, and the preferred mode 610. The generate map module 602 can operate on the first device 102 of FIG. 5 or the second device 106 of FIG. 5, or partitioned between the two devices. For brevity of description, the generate map module 602 of the navigation system 100 will be described operating on the first device 102.

The generate map module 602 is illustrated as a number of modules. The generate map module 602 can include a coverage location module 702, a signal measurement module 704, a delineate module 706, and an assign mode module 708.

The coverage location module 702 obtains the first coverage location 604 of the first device 102. The coverage location module 702 can obtain the first coverage location 604 by receiving the first coverage location 604 of the first device 102 from a positioning system.

The coverage location module 702 can be implemented on the first device 102. For example, the location unit 506 of FIG. 5 can operate the coverage location module 702. The coverage location module 702 can receive the first coverage location 604 with the first communication unit 516 of FIG. 5, or the second communication unit 536 of FIG. 5, from the location unit 506.

Following the coverage location module 702, the generate map module 602 can operate the signal measurement module 704. The signal measurement module 704 measures the first coverage quality 606 associated with the first coverage location 604 for measuring the effectiveness of a positioning system at the first coverage location 604.

For example, if the coverage location module 702 utilizes a GPS positioning system for positioning information, the signal measurement module 704 can measure the first coverage quality 606 as the signal strength of the signal received from a GPS satellite. As a further example, if the coverage location module 702 utilizes a cellular-tower location system, the signal measurement module 704 can measure the first coverage quality 606 as the signal strength of the signal received from the cellular tower network. There are different ways to measure the quality of strength of a signal. An example can include received signal strength indication (RSSI), which is often used in wireless systems.

The signal measurement module 704 can compare the first coverage quality 606 with a predefined threshold 710. The predefined threshold 710 is a signal metric that the strength or quality of a signal above the predefined threshold 710 can be considered effective for the navigation system 100. The strength or quality of a signal below the predefined threshold 710 is considered ineffective or impaired for the purpose of positioning in the navigation system 100. The signal measurement module 704 can determine whether the first coverage quality 606 at the first coverage location 604 is below the predefined threshold 710.

The signal measurement module 704 can be implemented on the first device 102, the second device 106, or a combination thereof. For example, the first control unit 512 of FIG. 5 can couple to the location unit 506 to operate the signal measurement module 704. Also for example, the signal measurement module 704 can be operated by the first control unit 512, the second control unit 534 of FIG. 5, or partitioned between the first control unit 512 and the second control unit 534.

Following the signal measurement module 704, the generate map module 602 can operate the delineate module 706. If the first coverage quality 606 is below the predefined threshold 710, then the delineate module 706 delineate the coverage boundary 304 enclosing the adaptive coverage area 306.

The delineate module 706 can receive the first coverage location 604 from the coverage location module 702. If the first coverage quality 606 is below the predefined threshold 710 for signal strength or quality, then the delineate module 706 can generate or modify or update the coverage map 608 with the coverage boundary 304 around the adaptive coverage area 306.

Generating the coverage map 608 can mean building a new reference map or modifying an existing map. Maps are provided by vendors for use with navigation and guidance systems for providing the relevant information for navigation and guidance purposes. Such maps can be modified or used by the delineate module 706 to include the coverage boundary 304 around the adaptive coverage area 306.

As will be described, the adaptive coverage area 306 can be assigned with the preferred mode 610. As will also be described, a device, such as the first device 102, can switch to the preferred mode 610 while in the adaptive coverage area 306. As will also be described, the navigation system 100 can schedule a switch to or select the preferred mode 610 in anticipation of the first device 102 proceeding into the adaptive coverage area 306.

The coverage boundary 304 can be generated according to different criteria. In the example of the first coverage location 604 at a junction in an urban setting, the delineate module 706 can generate the coverage boundary 304 to extend to a predetermined distance along each road segment connecting to the junction. As a further example of the urban setting, the delineate module 706 can generate the coverage boundary 304 to include each connecting road segment as far as the next junction on the road segment. A yet further example, the delineate module 706 can extend the coverage boundary 304 in a circle of a predetermined radius centered at the first coverage location 604.

Other examples of the coverage boundary 304 in an urban setting can apply, such as the first coverage location 604 on a road segment between junctions. In this example, the delineate module 706 can generate the coverage boundary 304 to encompass the road segment up to the junctions at the end points of the road segment.

The coverage boundary 304 can also be generated to satisfy a combination of requirements. For example, in the urban setting, the coverage boundary 304 can be generated to encompass the junctions bounding a road segment subject to a maximum distance. This example would ensure that the coverage boundary 304 around an interstate with few intersections would not cause the coverage boundary 304 to be excessive.

The navigation system 100 can also operate in rural areas, which are sparsely populated compared to the urban setting described above. Rural areas are less likely to be subjected to the "urban canyon" effect of a metropolitan area. However, cell tower networks can be less prevalent in rural areas, and the use of cell tower positioning may be compromised. The preferred mode 610 can include a modified GPS sampling rate to compensate for comprised GPS signaling and limited cell tower positioning.

The delineate module 706 can also edit or modify or update an existing version of the coverage boundary 304. For example, the coverage location module 702 can obtain a second coverage location 712 close to and presently outside of the adaptive coverage area 306. The second coverage location 712 is defined as a location outside the coverage boundary 304 located close or proximate to the first coverage location 604, which is in the adaptive coverage area 306 enclosed by the coverage boundary 304. The signal measurement module 704 can determine a second coverage quality 714, at the second coverage location 712, below the predefined threshold 710. The second coverage quality 714 is a measure of the effectiveness of a positioning system at the second coverage location 712.

As with the first coverage quality 606, the signal measurement module 704 can determine whether the second coverage quality 714 is below the predefined threshold 710. If the second coverage quality 714 is below the predefined threshold 710, then the delineate module 706 can extend the coverage boundary 304, which bounds the adaptive coverage area 306, to include the second coverage location 712. In this example, the delineate module 706 can distinguish that the second coverage location 712 is close enough to the first coverage location 604 that the navigation system 100 can treat them as being part of the same area with compromised signal quality, and therefore they can be enclosed by the coverage boundary 304.

As another example, the delineate module 706 can determine whether a second version or another instance of the coverage boundary 304 can delineate the second coverage location 712. In this example, the second coverage location 712 can be located at a distance of more than a city block, or more than a predefined distance from the first coverage location 604. Under such circumstances, the delineate module 706 can delineate separate versions or a number of different areas each delineated by its own version of the coverage boundary 304 to enclose the first coverage location 604 and the second coverage location 712.

As a yet further example of the coverage boundary 304, the coverage location module 702 can obtain the second coverage location 712 at a location which is already inside the adaptive coverage area 306 enclosed in the coverage boundary 304. In this example, the delineate module 706 can distinguish that the second coverage location 712 with the second coverage quality 714 below the predefined threshold 710 is inside the coverage boundary 304. The delineate module 706 can determine that the coverage boundary 304 can be sufficient to include the second coverage location 712 without being modified.

The navigation system 100 can also modify the coverage boundary 304 when a positioning system is determined to be sufficient at a location which is inside the coverage boundary 304. In this example, the positioning coverage can be transient, as in the case of satellite geometry impacting GPS coverage. The positioning system can be compromised by the position of the GPS constellation of satellites relative to the location of the navigation system 100. As time passes and satellites change position relative to one another, the positioning coverage of the GPS can improve and degrade at any location.

The coverage location module 702 can obtain the second coverage location 712 inside the coverage boundary 304 and inside the adaptive coverage area 306. The signal measurement module 704 can determine that the second coverage quality 714 at the second coverage location 712 meets or exceeds the predefined threshold 710. The delineate module 706 can decrease the coverage boundary 304 to exclude the second coverage location 712 from the adaptive coverage area 306.

The delineate module 706 can also delineate more than one of the coverage boundary 304. For example, the second coverage location 712 can be at a distance from the coverage boundary 304, and the second coverage quality 714 can be below the predefined threshold 710. In this example, extending the coverage boundary 304 to include the second coverage location 712, which can include the current location 614 of FIG. 6, would make the coverage boundary to be excessively widespread, and could include some areas in which the performance of the positioning system is not compromised.

Instead, the navigation system 100 can generate a further of the coverage boundary 304 with a further of the adaptive coverage area 306 and the further instance does not overlap the adaptive coverage area 306 that includes the first coverage location 604. In this example, the coverage map 608 can have more than one version of the coverage boundary 304, each enclosing a version of the adaptive coverage area 306, and each with a version of the preferred mode 610.

The delineate module 706 can be implemented on the first device 102. For example, the first control unit 512 can edit the coverage map 608 to generate or modify the coverage boundary 304 with the adaptive coverage area 306.

The delineate module 706 can be implemented in the navigation system 100. For example, the delineate module 706 can be operated by the first control unit 512, the second control unit 534, or partitioned between the first control unit 512 and the second control unit 534, in the navigation system 100. The coverage map 608 can be edited by the first control unit 512, the second control unit 534, or a combination thereof to generate or modify the coverage boundary 304 with the adaptive coverage area 306.

The delineate module 706 and can generate the coverage map 608 with the adaptive coverage area 306 around the first coverage location 604, and with the preferred mode 610 for operating a positioning system inside the adaptive coverage area 306.

The delineate module 706 can delineate the coverage boundary 304 enclosing the adaptive coverage area 306. Delineating the coverage boundary 304 enclosing the adaptive coverage area 306 can include adding or modifying an outline or geofence around the adaptive coverage area 306 in the coverage map 608.

Following the delineate module 706, the generate map module 602 can include and can operate the assign mode module 708. The assign mode module 708 assigns the preferred mode 610 to the adaptive coverage area 306 for operating a positioning system on the first device 102 in the adaptive coverage area 306. Assigning the preferred mode 610 to the adaptive coverage area 306 can include identifying a positioning system, or mode of operation of a positioning system, which can operate effectively in the adaptive coverage area 306. Collectively, the delineate module 706 and the assign mode module 708 can generate or modify one or more versions of the coverage boundary 304 to enclose the adaptive coverage area 306 and assign the adaptive coverage area 306 with the preferred mode 610.

The assign mode module 708 can assign the preferred mode 610 in a number of different ways. For example, for an urban setting, in which GPS coverage is compromised by tall buildings, and which has a widespread cellular tower network, the preferred mode 610 can be a cellular-tower location system. In an application of the navigation system 100 in this example, a device with the navigation system 100 traversing the coverage boundary 304 into the adaptive coverage area 306 can operate the cellular-tower location system while inside the adaptive coverage area 306.

In the example of a rural setting with limited cellular coverage, the preferred mode 610 can be GPS with a modified sampling rate. If GPS positioning becomes temporarily compromised in a rural setting where cellular tower positioning is unavailable, examples of the preferred mode 610 can include an accelerometer location system, an inertial navigation system, or a combination thereof. In this example, the first device 102 traversing into the adaptive coverage area 306 can operate the accelerometer location system or the inertial navigation system while the first device 102 is inside the adaptive coverage area 306.

The modules of the generate map module 602 can construct, edit, modify, or update the coverage map 608 with the coverage boundary 304, the adaptive coverage area 306, and the preferred mode 610. As will be described in more detail, the mode select module 612 of FIG. 6 can determine a traversal by a device such as the first device 102 into the adaptive coverage area 306, and can schedule a switch to the preferred mode 610.

The assign mode module 708 can be implemented on the first device 102. For example, the first control unit 512 of the first device 102 can edit the coverage map 608 to add the preferred mode 610, and to associate the preferred mode 610 with the adaptive coverage area 306 and the coverage boundary 304.

The assign mode module 708 can also be implemented in the navigation system 100. For example, the coverage map 608 can be edited by the first control unit 512, the second control unit 534, or a combination thereof to add the preferred mode 610, and to associate the preferred mode 610 with the adaptive coverage area 306 and the coverage boundary 304.

Figure 8:
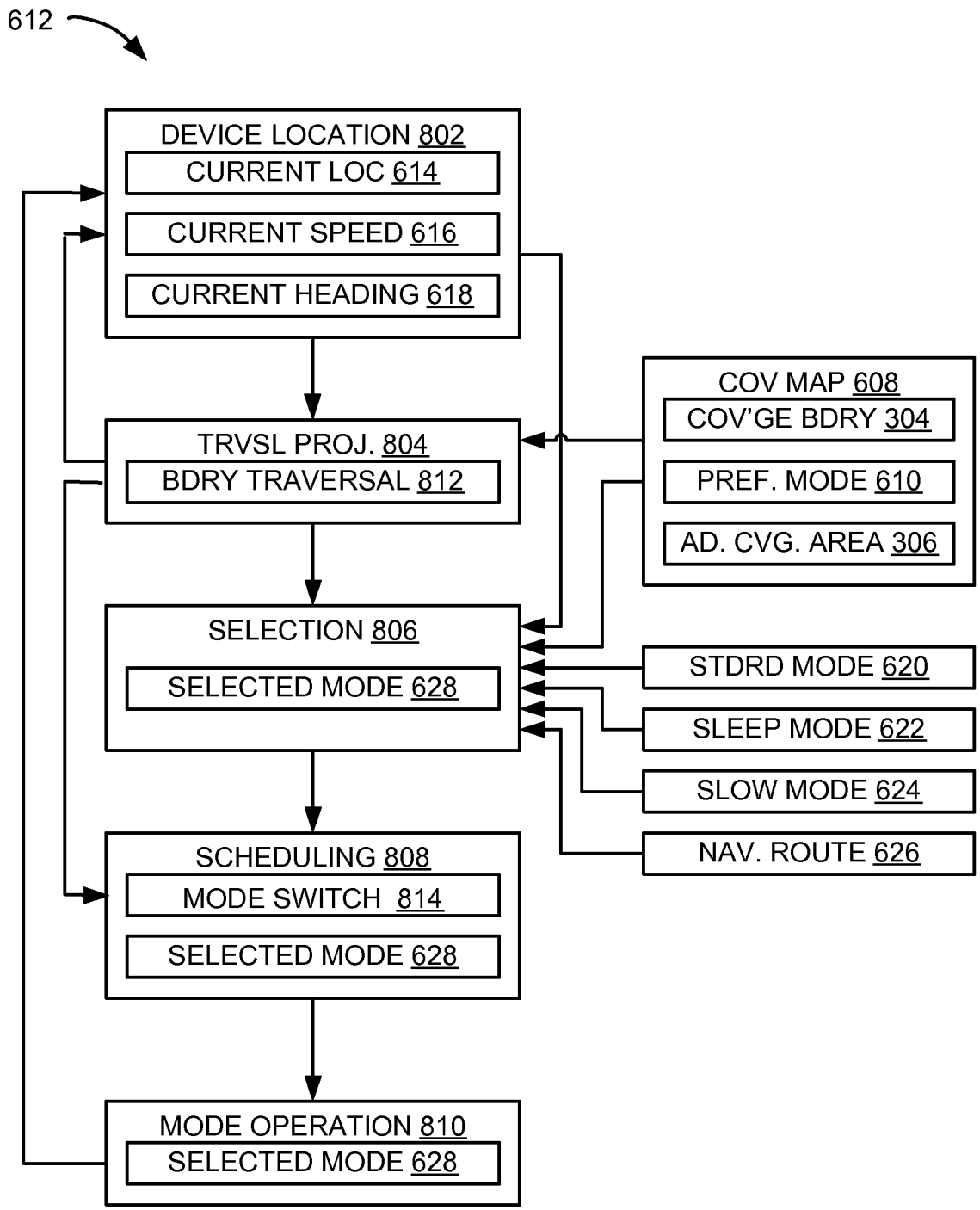
FIG. 8 is a flow chart of the mode select module.

Referring now to FIG. 8, therein is shown a flow chart of the mode select module 612. The mode select module 612 can include the modules and functions for projecting a traversal by a device, such as the first device 102 of FIG. 1, of the coverage boundary 304 into the adaptive coverage area 306. The mode select module 612 can also operate the preferred mode 610 on the first device 102 in response to the traversal of the coverage boundary 304.

The mode select module 612 can operate on the first device 102 of FIG. 5, the second device 106 of FIG. 5, or partitioned between the first device 102 and the second device 106. For clarity of description, the mode select module 612 will be described operating on the first device 102.

The mode select module 612 is shown with a number of modules including a device location module 802, a traversal projection module 804, a selection module 806, a scheduling module 808, and a mode operation module 810. The control flow in the mode select module 612 can pass from one module to another as indicated in the illustration.

The device location module 802 obtains the current location 614 for locating the first device 102. The current location 614 is a geographic position of the first device 102, and can be represented as a street address, an intersection of thoroughfares, latitude and longitude coordinates, or a combination thereof, to identify the position of the first device 102. The current location 614 can be outside or inside the adaptive coverage area 306.

The device location module 802 also obtains the current speed 616 of the first device 102, and the current heading 618 of the first device 102. The current heading 618 is the direction of travel of the first device 102, and can be measured by another device or module of the navigation system 100. The current speed 616 is the rate of travel of the first device 102, and can be received from another device or module of the navigation system 100. The device location module 802 can also receive the navigable route 626 from another device or module of the navigation system 100.

The device location module 802 can be implemented on the first device 102. For example, the location unit 506 of FIG. 5 can obtain the current location 614, the current heading 618, and the current speed 616. The device location module 802 can also be implemented in the navigation system 100 of FIG. 6. For example, the device location module 802 can obtain the current location 614, the current heading 618, and the current speed 616 with the first communication unit 516 of FIG. 5, or the second communication unit 536 of FIG. 5, from the location unit 506.

The device location module 802 can send the current location 614, the current speed 616, and the current heading 618 to the traversal projection module 804. The traversal projection module 804 can receive the current location 614, the current speed 616, and the current heading 618 from the device location module 802. The traversal projection module 804 can also receive the coverage map 608 from the generate map module 602.

The purpose of the traversal projection module 804 is to project a boundary traversal 812 by the first device 102 into the adaptive coverage area 306. Projecting the boundary traversal 812 can mean predicting the time and place at which a device with the navigation system 100 can be expected to cross the coverage boundary 304 into the adaptive coverage area 306.

The traversal projection module 804 can calculate the boundary traversal 812 of the coverage boundary 304 by the first device 102 based on the current location 614, the current heading 618 as traveling towards the coverage boundary 304, and the current speed 616 of the first device 102, and the coverage boundary 304. The traversal projection module 804 can also project the boundary traversal 812 out of the adaptive coverage area 306, in the example where the first device 102 inside the adaptive coverage area 306 is forecast to traverse the coverage boundary 304.

The boundary traversal 812 can include details required for describing the traversal to the navigation system 100. For example, the boundary traversal 812 can include a time component and a location component. The time component can have a calculation of when the traversal can occur, and the location component can have a calculation of a position on the coverage boundary 304 where the traversal can occur.

The traversal projection module 804 can calculate the location component of the boundary traversal 812. As an example, the traversal projection module 804 can extrapolate from the current location 614 along the direction of the current heading 618 to the coverage boundary 304. This can be the location component of the boundary traversal 812.

The traversal projection module 804 can also calculate the time component of the boundary traversal 812. For example, the traversal projection module 804 can calculate the time required to traverse from the current location 614 to the location component on the coverage boundary 304 of the boundary traversal 812 traveling at the current speed 616.

The traversal projection module 804 can also renew the boundary traversal 812, so that the boundary traversal 812 can be kept up to date. For example, as the first device 102 progresses, the first device 102 is likely to change direction or to change speed. The traversal projection module 804 can recalculate the boundary traversal 812 at regular intervals. For example, for each location sample by the positioning system, the traversal projection module 804 can recalculate the boundary traversal 812. This renewal of the boundary traversal 812 enables the operation of the mode select module 612 to remain relevant to the progress of the first device 102.

The traversal projection module 804 can also project that the first device 102 will not traverse the coverage boundary 304. As an example, the traversal projection module 804 can extrapolate the current heading 618 from the first device 102, and determine that the current heading 618 does not intersect the coverage boundary 304. As another example, the adaptive coverage area 306 can be excluded from the coverage map 608 if the generate map module 602 of FIG. 6 does not identify any areas of compromised coverage in the geographic region 302 of FIG. 3. In these examples, the traversal projection module 804 does not project the boundary traversal 812 and the traversal projection module 804 can return to the device location module 802 to continue to monitor the progress of the first device 102.

The traversal projection module 804 can be implemented on the first device 102. For example, the first control unit 512 of FIG. 5 can receive the current location 614, the current speed 616, and the current heading 618 from the location unit 506. The first control unit 512 can also receive the coverage map 608 from the first storage unit 514. The first control unit 512 can extrapolate the current heading 618 from the current location 614 to the coverage boundary 304 to identify the location component of the boundary traversal 812. The first control unit 512 can also calculate the time component of the boundary traversal 812.

The traversal projection module 804 can also be implemented in the navigation system 100. For example, the first communication unit 516 can send the current location 614, the current speed 616, and the current heading 618 from the first device 102 to the second communication unit 536. The second control unit 534 of FIG. 5 can receive the current location 614, the current speed 616, and the current heading 618 from the second communication unit 536. The second control unit 534 can receive the coverage map 608 from the second storage unit 546 of FIG. 5. The second control unit 534 can extrapolate the current heading 618 from the current location 614 to the coverage boundary 304 for calculating the location component of the boundary traversal 812. The second control unit 534 can also calculate the time component of the boundary traversal 812.

The traversal projection module 804 can send the boundary traversal 812 to the selection module 806. The purpose of the selection module 806 is to select the selected mode 628, being the preferred mode 610 associated with the adaptive coverage area 306. The selection module 806 can receive the boundary traversal 812 from the traversal projection module 804. The selection module 806 can also receive the current location 614, the current speed 616, and the current heading 618 from the device location module 802. The selection module 806 can also receive the coverage map 608 from the generate map module 602. The selection module 806 can also receive the standard mode 620, the sleep mode 622, and the slow mode 624 from another module or storage location of the navigation system 100. The selection module 806 can also receive the navigable route 626, if available, from another device or module of the navigation system 100.

The preferred mode 610 can be a positioning system, or mode of operation of a positioning system for operating by the navigation system 100. In another example, the selection module 806 can select the standard mode 620, which can operate effectively outside the adaptive coverage area 306, to be the selected mode 628. In other examples, the selection module 806 can also select the sleep mode 622 or the slow mode 624 to be the selected mode 628, when the first device 102 is operating under particular circumstances.

From the location component of the boundary traversal 812, the selection module 806 can select the preferred mode 610 associated with the adaptive coverage area 306 to be the selected mode 628. As will be described, the selected mode 628 can begin to operate as the first device 102 traverses the coverage boundary 304 into the adaptive coverage area 306.

In the example where the first device 102 is traversing the coverage boundary 304 out of the adaptive coverage area 306, the first device 102 can be moving from an area with compromised positioning coverage to an area with effective positioning coverage. In this example, the selection module 806 can select the standard mode 620 as the selected mode 628.

The selection module 806 can select the slow mode 624 as the selected mode 628. The purpose of selecting the slow mode 624 is that the positioning system will operate at a sampling rate which will limit power consumption.

As an example, the device location module 802 can determine that the first device 102 is approaching the end of the navigable route 626. The device location module 802 can compare the current location 614 with the navigable route 626, for example. If the current location 614 is close to the end of the navigable route 626, the selection module 806 can select the slow mode 624 to be the selected mode 628, as the need for frequent location sampling is lessened as the first device 102 approaches to the target location.

Also, the selection module 806 can determine that the current speed 616 is below the speed limit for a road segment. If the selection module 806 determines that the first device 102 has been traveling significantly below the speed limit for a significant time, then the selection module 806 can select the slow mode 624 to be the selected mode 628. An example of the first device 102 at significantly below the speed limit could be a car in traffic congestion on a freeway. In this example, the speed limit can be 55 miles per hour, while the actual traffic speed can be five miles per hour, meaning that frequent location samples can be unnecessary.

The selection module 806 can be implemented on the first device 102. For example, the first control unit 512 can receive the current location 614, the current speed 616, and the current heading 618 from the location unit 506. The first control unit 512 can also receive the coverage map 608 from the first storage unit 514. The first control unit 512 can also receive the standard mode 620, the sleep mode 622, and the slow mode 624 from the first storage unit 514. In the example of the traversal of the coverage boundary 304, the first control unit 512 can identify the preferred mode 610 as the mode associated with the adaptive coverage area 306, having already projected the boundary traversal 812. In another example, the first control unit 512 can selected the standard mode 620, the sleep mode 622, or the slow mode 624 to be the selected mode 628.

The selection module 806 can also be implemented in the navigation system 100. For example, the first communication unit 516 can send the current location 614, the current speed 616, and the current heading 618 from the first device 102 to the second communication unit 536. The second control unit 534 can receive the current location 614, the current speed 616, and the current heading 618 from the second communication unit 536. The second control unit 534 can receive the coverage map 608 from the second storage unit 546, having already calculated the boundary traversal 812 in the traversal projection module 804.

The first control unit 512 can also receive the standard mode 620, the sleep mode 622, and the slow mode 624 from the first storage unit 514. The second control unit 534 can identify the preferred mode 610, associated with the adaptive coverage area 306 as the selected mode 628. The second control unit 534 can also select the standard mode 620, the sleep mode 622, or the slow mode 624 to be the selected mode 628.

Having selected the selected mode 628, the selection module 806 can send the selected mode 628 to the scheduling module 808. The purpose of the scheduling module 808 is to schedule a mode switch 814 to the selected mode 628 to coincide or approximately before with the boundary traversal 812 in anticipation of proceeding into the adaptive coverage area 306. The scheduling module 808 can receive the selected mode 628 from the selection module 806. The scheduling module 808 can also receive the boundary traversal 812 from the traversal projection module 804. In some of the examples described earlier, the transition to the selected mode 628 can be unrelated to the current location 614 of the first device 102.

The scheduling module 808 can receive the boundary traversal 812 and the selected mode 628. Based on the time component of the boundary traversal 812, the scheduling module 808 can schedule the mode switch 814 to the selected mode 628 to coincide with the boundary traversal 812. For example, if the time component of the boundary traversal 812 is expressed as a clock time, the scheduling module 808 can simply express the time component as the mode switch 814. In this example, the mode switch 814 can include a string of characters, numbers, or a combination thereof, such as "4:18: 22 pm PST".

In another example, the time component of the boundary traversal 812 can be expressed as a countdown, or an offset from a current time. In this example, the mode switch 814 can also include a string of characters, such as "0 hrs, 0 mins, 22 secs".

In the example of the selected mode 628 as the sleep mode 622, the mode switch 814 can be scheduled immediately, since the switch to the sleep mode 622 is not dependent on the boundary traversal 812. For the same reason, in the example of the selected mode 628 as the slow mode 624, the mode switch 814 can also be set to immediate.

The scheduling module 808 can be implemented on the first device 102. For example, the first control unit 512 can generate the mode switch 814 from the time component of the boundary traversal 812.

The selection module 806 can also be implemented in the navigation system 100. For example, the first communication unit 516 can send the boundary traversal 812 from the first device 102 to the second communication unit 536 of the second device 106.

The second control unit 534 can receive the boundary traversal 812 from the second communication unit 536. The second control unit 534 can generate the mode switch 814 from the time component of the boundary traversal 812. The second communication unit 536 can send the mode switch 814 from the second device 106 to the first communication unit 516.

The scheduling module 808 can send the mode switch 814 and the selected mode 628 to the mode operation module 810. The mode operation module 810 can receive the selected mode 628 and the mode switch 814. The purpose of the mode operation module 810 is to operate the selected mode 628 on the first device 102 inside the adaptive coverage area 306 as the mode switch 814 is realized.

As the boundary traversal 812 takes place and the mode switch 814 is realized, the mode operation module 810 can initiate operation of the selected mode 628 in place of the currently operating positioning system. As mentioned, the selected mode 628 can be an inertial navigation system, an accelerometer location system, or GPS with modified settings or sampling rate, based on the preferred mode 610 associated with the adaptive coverage area 306.

In the example of the boundary traversal 812 out of the adaptive coverage area 306, the selected mode 628 can be the standard mode 620 for a positioning system for the navigation system 100. The mode operation module 810 can suspend the operation of the preferred mode 610 associated with the adaptive coverage area 306, and operate the standard mode 620.

In the example of the first device 102 moving slowly compared to the speed limit of its location, the mode operation module 810 can operate the selected mode 628 being the slow mode 624. In the example of the first device 102 being stationary for a predefined period of time, the selected mode 628 can be the sleep mode 622, and the mode operation module 810 can operate the selected mode 628 being the sleep mode 622.

The mode operation module 810 can be implemented on the first device 102. For example, the first control unit 512 can send an instruction to the location unit 506 to suspend the current mode of operation, and to initiate the positioning system included with the selected mode 628.

The mode operation module 810 can also be implemented in the navigation system 100. For example, the first control unit 512 can send an instruction to the location unit 506 to suspend the current mode of operation, and to initiate the positioning system included with the selected mode 628. As a further example, the second communication unit 536 can send an instruction from the second control unit 534 to the first device 102. The first communication unit 516 can receive the instruction from the second communication unit 536 to suspend the current mode of operation, and to initiate the mode of operation included with the selected mode 628.

The navigation system 100 can receive information and data about positioning conditions at a local level from one or more devices with the navigation system 100. Such devices can be widespread throughout the geographic region 302, so the pool of information can reflect positioning conditions across broad areas of the geographic region 302. It has been discovered that using the information from a number of devices can enhance the accuracy of the navigation system 100.

As devices with the navigation system 100 return condition information about their location, the coverage boundary 304 can be updated in real-time, and the navigation system 100 can remain current. It has been discovered that the coverage boundary 304 with the preferred mode 610 can provide a real-time map of the local effectiveness of location-finding conditions for the geographic region 302. It has also been discovered that the present invention can provide advance notice of local positioning conditions to devices with the navigation system 100, enabling the devices to adapt to the conditions and to operate with minimal interference and with more reliable positioning coverage. The devices pool their information in the navigation system 100, from which user of the navigation system 100 can benefit significantly.

The physical transformation of the current location 614, the current speed 616 and the current heading 618 into the selected mode 628 results in movement in the physical world, such as people using the first device 102 or vehicles, based on the operation of the navigation system 100. As the movement in the physical world occurs, the movement itself creates additional information that is converted back to positioning system for the continued operation of the navigation system 100 and to continue the movement in the physical world.

Thus, it has been discovered that the navigation system of the present invention furnishes important and heretofore unknown and unavailable solutions, capabilities, and functional aspects for reliable positioning functions.

Figure 9:
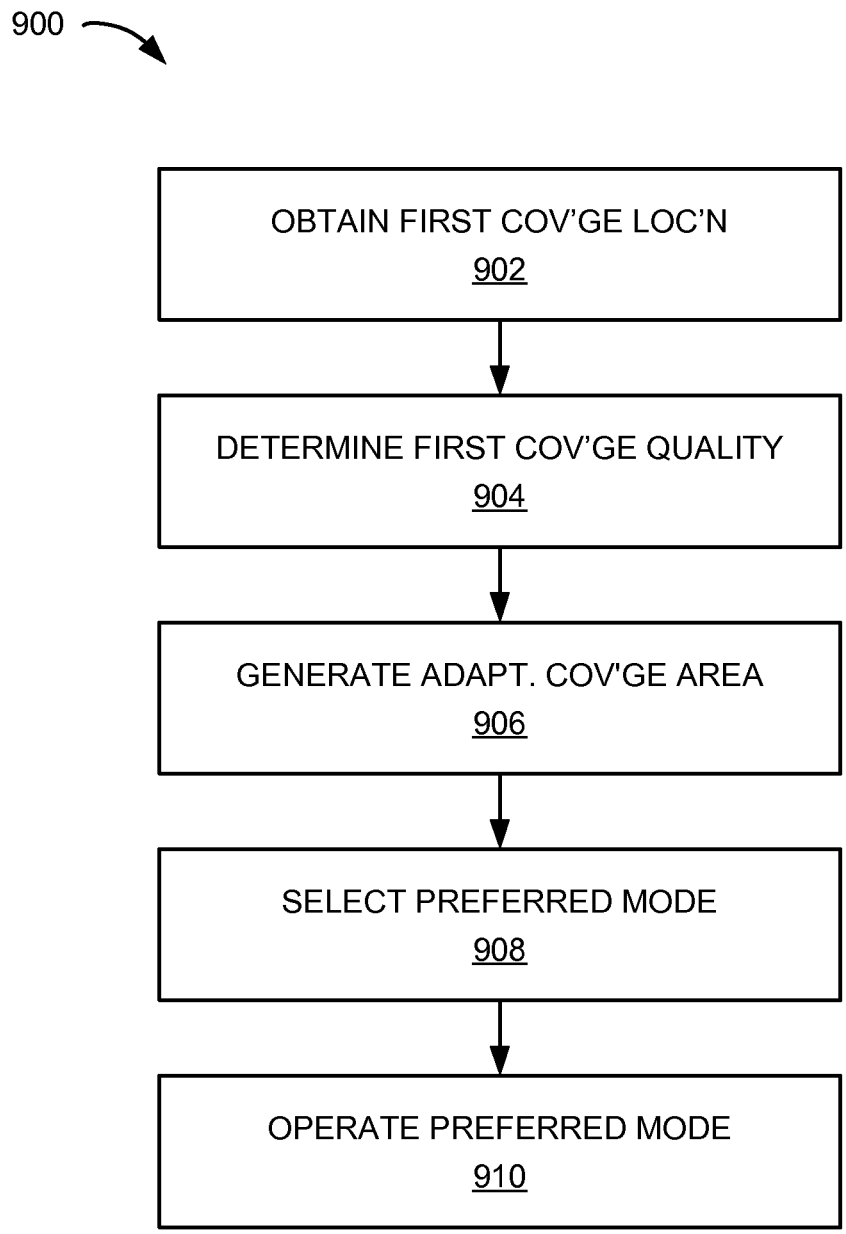
FIG. 9 is a flow chart of a method of operation of the navigation system in a further embodiment of the present invention.

Referring now to FIG. 9, therein is shown a flow chart of a method 900 of operation of the navigation system 100 in a further embodiment of the present invention. The method 900 includes: obtaining a first coverage location in a block 902; determining a first coverage quality at the first coverage location is below a predefined threshold in a block 904; generating an adaptive coverage area around the first coverage location for displaying on a device in a block 906; selecting a preferred mode for positioning fix associated with the adaptive coverage area in a block 908; and operating the preferred mode inside the adaptive coverage area in a block 910.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    obtaining a first coverage location;
    determining a first coverage quality at the first coverage location is below a predefined threshold with a control unit;
    generating an adaptive coverage area around the first coverage location for displaying on a device;
    selecting a preferred mode for positioning fix associated with the adaptive coverage area; and
    operating the preferred mode inside the adaptive coverage area.

2. The method as claimed in claim 1 further comprising:
    identifying a current location outside the adaptive coverage area for locating a further device; and
    projecting a boundary traversal into the adaptive coverage area.

3. The method as claimed in claim 1 further comprising:
    obtaining a second coverage location outside the adaptive coverage area;
    determining a second coverage quality at the second coverage location is below the predefined threshold; and
    extending the adaptive coverage area to include the second coverage location.

4. The method as claimed in claim 1 further comprising:
    obtaining a second coverage location inside the adaptive coverage area;
    determining a second coverage quality at the second coverage location meets or exceeds the predefined threshold; and
    decreasing the adaptive coverage area to exclude the second coverage location.

5. The method as claimed in claim 1 further comprising:
    identifying a current location outside the adaptive coverage area for locating a further device;
    obtaining a second coverage location outside the adaptive coverage area where the second coverage location includes the current location;
    determining a second coverage quality at the second coverage location is below the predefined threshold; and
    generating a further adaptive coverage area, not overlapping the adaptive coverage area, to include the second coverage location.

6. A method of operation of a navigation system comprising:
obtaining a first coverage location with a location unit; location;
determining a first coverage quality at the first coverage location is below a predefined threshold with a control unit;
generating an adaptive coverage area around the first coverage location with the first coverage quality below the predefined threshold for displaying on a device;
selecting a preferred mode for positioning fix associated with the adaptive coverage area;
scheduling a switch to the preferred mode in anticipation of proceeding into the adaptive coverage area; and
operating the preferred mode inside the adaptive coverage area.

7. The method as claimed in claim 6 further comprising:
identifying a current location inside the adaptive coverage area for locating a further device; and
selecting a slow mode for positioning fix as the current location approaches a target location.

8. The method as claimed in claim 6 further comprising:
identifying a current location for locating a further device; and
selecting a sleep mode for positioning fix as the current location is stationary.

9. The method as claimed in claim 6 wherein generating the adaptive coverage area includes delineating a coverage boundary enclosing the adaptive coverage area.

10. The method as claimed in claim 6 wherein selecting the preferred mode includes assigning an inertial navigation for positioning fix.

11. A navigation system comprising:
a coverage location module for obtaining a first coverage location;
a signal measurement module, coupled to the coverage location module, for determining a first coverage quality at the first coverage location is below a predefined threshold;
a delineate module, coupled to the signal measurement module, for generating an adaptive coverage area around the first coverage location for displaying on a device;
a selection module, coupled to the delineate module, for selecting a preferred mode for positioning fix associated with the adaptive coverage area; and
a mode operation module, coupled to the selection module, for operating the preferred mode inside the adaptive coverage area.

12. The system as claimed in claim 11 further comprising:
a device location module, coupled to the selection module, for identifying a current location outside the adaptive coverage area for locating a further device; and
a traversal projection module, coupled to the device location module, for projecting a boundary traversal into the adaptive coverage area.

13. The system as claimed in claim 11 wherein:
the coverage location module is for obtaining a second coverage location outside the adaptive coverage area;
the signal measurement module is for determining a second coverage quality at the second coverage location is below the predefined threshold; and
the delineate module is for extending the adaptive coverage area to include the second coverage location.

14. The system as claimed in claim 11 wherein:
the coverage location module is for obtaining a second coverage location inside the adaptive coverage area;
the signal measurement module is for determining a second coverage quality at the second coverage location meets or exceeds the predefined threshold; and
the delineate module is for decreasing the adaptive coverage area to exclude the second coverage location.

15. The system as claimed in claim 11 further comprising:
a device location module, coupled to the selection module, for identifying a current location outside the adaptive coverage area for locating a further device; and
wherein:
the coverage location module is for obtaining a second coverage location outside the adaptive coverage area where the second coverage location includes the current location;
the signal measurement module is for determining a second coverage quality at the second coverage location meets or exceeds the predefined threshold; and
the delineate module is for generating a further adaptive coverage area, not overlapping the adaptive coverage area, to include the second coverage location.

16. The system as claimed in claim 11 wherein:
the delineate module is for generating the adaptive coverage area around the first coverage location with the first coverage quality below the predefined threshold for displaying on a device; and
further comprising:
a scheduling module, coupled to the selection module, for scheduling a switch to the preferred mode in anticipation of proceeding into the adaptive coverage area.

17. The system as claimed in claim 16 further comprising:
a device location module, coupled to the selection module, for identifying a current location outside the adaptive coverage area for locating a further device; and
wherein:
the selection module is for selecting a slow mode for positioning fix as the current location approaches a target location.

18. The system as claimed in claim 16 further comprising:
a device location module, coupled to the selection module, for identifying a current location for locating a further device; and
wherein:
the selection module is for selecting a sleep mode for positioning fix as the current location is stationary.

19. The system as claimed in claim 16 wherein the delineate module is for delineating a coverage boundary enclosing the adaptive coverage area.

20. The system as claimed in claim 16 further comprising an assign mode module, coupled to the delineate module, for assigning an inertial navigation for positioning fix.

* * * * *